United States Patent
Yang et al.

(10) Patent No.: US 11,623,491 B2
(45) Date of Patent: Apr. 11, 2023

(54) SHOCK ABSORBER AND AUTOMOBILE

(71) Applicant: NIO TECHNOLOGY (ANHUI) CO., LTD, Hefei (CN)

(72) Inventors: Tian Yang, Hefei (CN); Qunfei Yao, Hefei (CN); Zhenqiang Wu, Hefei (CN)

(73) Assignee: NIO TECHNOLOGY (ANHUI) CO., LTD., Hefei (CN)

( * ) Notice: Subject to any disclaimer, the term of this patent is extended or adjusted under 35 U.S.C. 154(b) by 0 days.

(21) Appl. No.: 17/582,146

(22) Filed: Jan. 24, 2022

(65) Prior Publication Data

US 2022/0234407 A1 Jul. 28, 2022

(30) Foreign Application Priority Data

Jan. 25, 2021 (CN) ......................... 202110094479.X

(51) Int. Cl.
*B60G 15/08* (2006.01)
*B60G 11/27* (2006.01)
*B60G 13/00* (2006.01)

(52) U.S. Cl.
CPC .............. *B60G 15/08* (2013.01); *B60G 11/27* (2013.01); *B60G 13/003* (2013.01)

(58) Field of Classification Search
CPC .. B60G 2202/314; B60G 15/12; B60G 15/08; B60G 11/27; B60G 13/003; F16F 9/05; F16F 9/0454; F16F 9/084
USPC .................................................. 280/124.157
See application file for complete search history.

(56) References Cited

U.S. PATENT DOCUMENTS

| | | | |
|---|---|---|---|
| 9,296,272 B2* | 3/2016 | Leonard | F16F 9/36 |
| 10,260,590 B2* | 4/2019 | DeBruler | F16F 9/084 |
| 10,502,278 B2* | 12/2019 | Weber | F16F 9/084 |
| 10,618,366 B2 | 4/2020 | Pniewski et al. | |
| 10,895,300 B2* | 1/2021 | Dehlwes | F16F 9/049 |
| 2003/0127781 A1 | 7/2003 | Fritz | |
| 2007/0023981 A1* | 2/2007 | Helmling | F16F 9/0472 267/64.15 |
| 2014/0175716 A1* | 6/2014 | Sugata | B60G 15/14 267/64.24 |
| 2016/0108985 A1* | 4/2016 | Pniewski | F16F 9/084 267/64.27 |

(Continued)

FOREIGN PATENT DOCUMENTS

DE 102005052801 3/2011

OTHER PUBLICATIONS

Extended Search Report for European Patent Application No. 22150542.3, dated Jun. 13, 2022, 9 pages.

*Primary Examiner* — Paul N Dickson
*Assistant Examiner* — Caitlin Anne Miller
(74) *Attorney, Agent, or Firm* — Sheridan Ross P.C.

(57) ABSTRACT

Disclosed are a shock absorber and an automobile. The shock absorber includes a shock absorber cylinder and an air spring arranged around the shock absorber cylinder. The air spring includes a damping spring and a piston. A free end of the damping spring is supported at a free end of the piston. A support is disposed between the piston and the shock absorber cylinder. The free end of the piston is supported on the shock absorber cylinder by the support. In the shock absorber according to the invention, the piston and the shock absorber cylinder can be connected in a simple way.

11 Claims, 3 Drawing Sheets

(56) References Cited

U.S. PATENT DOCUMENTS

2017/0219041 A1    8/2017   Debruler et al.
2018/0298974 A1   10/2018   Dehlwes et al.

* cited by examiner

SHOCK ABSORBER AND AUTOMOBILE

CROSS-REFERENCE TO RELATED APPLICATION

This application claims the benefit of China Patent Application No. 202110094479.X filed Jan. 25, 2021, the entire contents of which are incorporated herein by reference in its entirety.

TECHNICAL FIELD

The invention relates to the field of automobiles, and in particular to a shock absorber and an automobile with such a shock absorber.

BACKGROUND ART

Automobiles have gradually become part of people's lives. As a means of transportation, automobiles are expected to have good riding comfort to relieve bumping of the automobiles driving on uneven roads, and are also expected to have good handling stability to prevent tilting or shaking of vehicle bodies when the automobiles accelerate at the starting or decelerate to brake and turn at a high speed. The quality of an automobile suspension system plays an important role in ensuring the riding comfort and the handling stability. The automobile suspension system is an elastic structure that connects wheels and a vehicle body. A shock absorber is one of major components of the automobile suspension system.

The stiffness and strength of the shock absorber play an important role in ensuring the riding comfort and the handling stability by means of the automobile suspension system. There is an automobile suspension system in which a piston of an air spring is attached to a shock absorber cylinder or a piston of an air spring is connected to a shock absorber cylinder through a complicated structure. The complicated structure has an unreliable connection relationship, which may result in over positioning.

Therefore, it is quite necessary to carry out adequate studies on the existing problems or defects including those mentioned above, so as to make improvements.

SUMMARY OF THE INVENTION

The invention provides a shock absorber, which is simple in structure and reliable in connection.

The shock absorber provided according to an aspect of the invention includes a shock absorber cylinder and an air spring arranged around the shock absorber cylinder. The air spring includes a damping spring and a piston. A free end of the damping spring is supported at a free end of the piston. A support is disposed between the piston and the shock absorber cylinder. The free end of the piston is supported on the shock absorber cylinder by the support.

In the shock absorber provided according to an aspect of the invention, the support and the free end of the piston are integrally constructed.

In the shock absorber provided according to an aspect of the invention, the periphery of the support abuts against the shock absorber cylinder.

In the shock absorber provided according to an aspect of the invention, the support is provided with an opening.

In the shock absorber provided according to an aspect of the invention, the opening is arranged on the periphery of the support.

In the shock absorber provided according to an aspect of the invention, the shock absorber cylinder is sleeved with an anti-impact cap, and the support is arranged between the piston and the anti-impact cap.

The shock absorber provided according to an aspect of the invention includes a base, and a fixed end, opposite the free end, of the piston abuts against the base.

In the shock absorber provided according to an aspect of the invention, a seal ring is disposed between the fixed end of the piston and the shock absorber cylinder.

The shock absorber provided according to an aspect of the invention includes a piston rod, the piston rod is inserted into the shock absorber cylinder, and the piston rod can move relative to the shock absorber cylinder.

The shock absorber provided according to an aspect of the invention includes a protective cylinder disposed peripherally, and a fixed end, opposite the free end, of the damping spring is fixedly connected to the protective cylinder.

The shock absorber provided according to an aspect of the invention is arranged between a vehicle body and a chassis.

In addition, the invention provides an automobile with such a shock absorber. Since the automobile has the shock absorber according to the invention, it is possible for the automobile to have the advantages as described above.

The beneficial effects of the invention include: the support is disposed between the piston and the shock absorber cylinder, and the free end of the piston can be supported on the shock absorber cylinder by the support, so that the piston and the shock absorber cylinder are connected in a simple way, and over positioning of the piston along an extension direction of the shock absorber cylinder is avoided.

BRIEF DESCRIPTION OF THE DRAWINGS

The disclosure of the invention is now described with reference to accompanying drawings. It should be appreciated that the accompanying drawings are merely used for the purpose of illustration, and are not intended to limit the scope of protection of the invention. In the accompanying drawings, unless otherwise specified, the same reference numerals are used to refer to the same components. In the figures.

DETAILED DESCRIPTION OF EMBODIMENTS

It can be readily understood that according to the technical solutions of the invention, a person of ordinary skill in the art may propose multiple interchangeable structures and implementations without changing the essential spirit of the invention. Therefore, the following specific implementations and the accompanying drawings are merely exemplary descriptions of the technical solutions of the invention, and should not be construed as the entirety of the invention or construed as limiting the technical solutions of the invention.

Directional terms, such as up, down, left, right, front, rear, front side, back side, top, and bottom, which are or may be mentioned in this description, are defined with respect to the structures shown in the accompanying drawings, and are relative concepts, and therefore may correspondingly vary depending on different positions and different conditions in use. Therefore, these or other directional terms should not be construed as restrictive terms as well.

In the description below, various parameters and components are described for embodiments of different structures, and these specific parameters and components are merely examples and not intended to limit the embodiments of this application.

Figure 1:
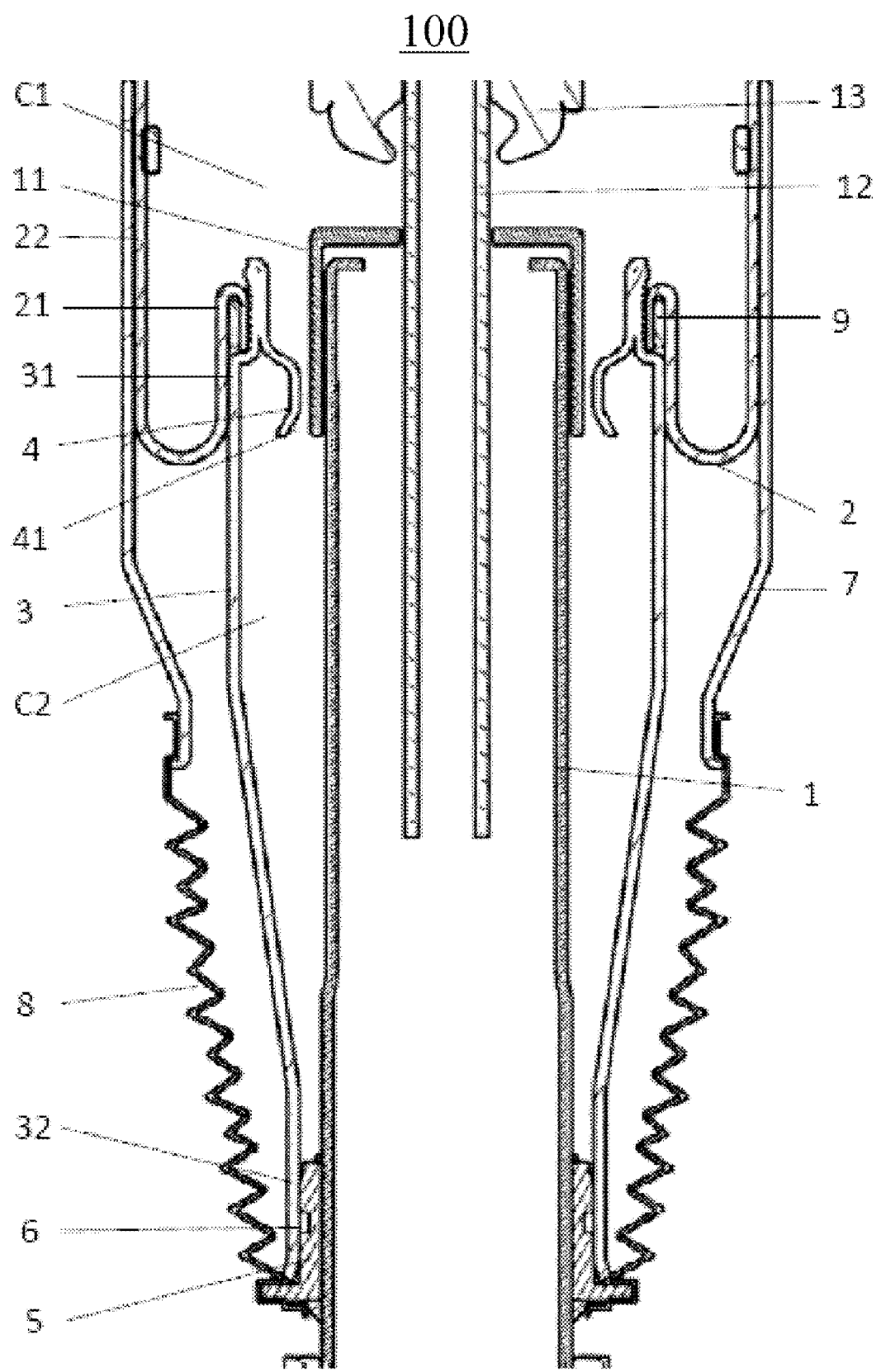
FIG. 1 illustrates a shock absorber according to an implementation of the invention.

An implementation according to the invention is shown with reference to FIG. 1. It can be seen therefrom: a shock absorber 100 includes a shock absorber cylinder 1 and an air spring arranged around the shock absorber cylinder 1. The air spring includes a damping spring 2 and a piston 3. The damping spring is constructed as a rubber bladder, for example. A free end 21 of the damping spring 2 is supported at a free end 31 (an upper end in the figure) of the piston 3. Exemplarily, the free end 21 of the damping spring 2 is provided with a clamp 9. The clamp 9 can be clamped to a protrusion arranged on the piston 3. The clamp 9 clamps the free end 31 of the piston 3 inwards on an outer surface of the protrusion of the piston 3 such that the free end 21 of the damping spring 2 is supported at the free end 31 of the piston 3. A support 4 is disposed between the piston 3 and the shock absorber cylinder 1, and the free end 31 of the piston 3 is supported on the shock absorber cylinder 1 by the support 4. In an installed state, the periphery of the support 4 abuts against the shock absorber cylinder 1.

Figure 2:
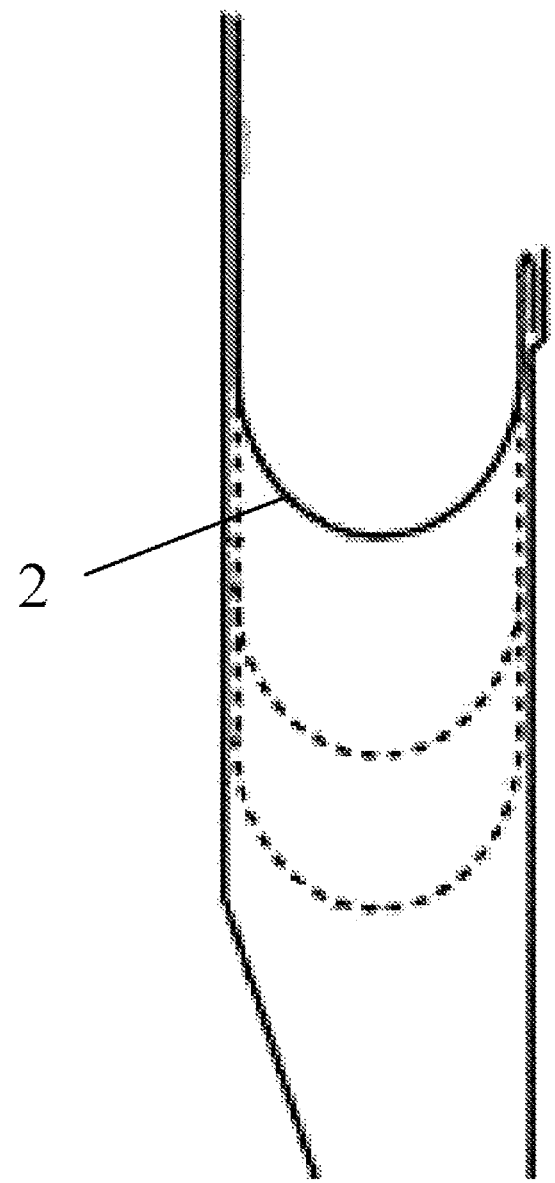
FIG. 2 illustrates a movement mode of a damping spring in the shock absorber in FIG. 1, where dotted lines show different movement positions of the damping spring.

Referring to FIG. 2, in a working process of the shock absorber, a relative position of the air spring changes. The free end 21 of the damping spring 2 drives the free end 31 of the piston 3 to move vertically along the shock absorber cylinder 1. The rubber bladder of the damping spring 2 rolls on an outer surface of the piston 3, for example, can be moved to positions shown by dotted lines in FIG. 2. In this process, the support 4 still firmly abuts against the shock absorber cylinder 1 to reliably support the free end 21 of the damping spring 2 and the free end 31 of the piston 3.

In the figure, exemplarily, an outer side of an upper end of the shock absorber cylinder 1 is sleeved with an anti-impact cap 11, and the anti-impact cap 11 plays a role in damping impact. The support 4 is arranged between the piston 3 and the anti-impact cap 11.

In the shock absorber according to the invention, the support 4 is disposed between the piston 3 and the shock absorber cylinder 1, and the free end 31 of the piston 3 can be supported on the shock absorber cylinder 1 by the support 4, so that the piston 3 and the shock absorber cylinder 1 are connected in a simple way. Compared with a fixed connection mode of the piston and the shock absorber cylinder in the prior art, over positioning of the piston 3 along an extension direction (i.e., a vertical direction in the figure) of the shock absorber cylinder 1 is avoided.

In the implementation shown in FIG. 1, the support 4 is provided with an opening 41. Exemplarily, the opening 41 is arranged on the periphery of the support 4. In the working process of the shock absorber, the damping spring 2, the piston 3, and the shock absorber cylinder 1 form a closed air chamber. Due to the support 4, the air chamber is divided into an upper chamber C1 above the base 4 and a lower chamber C2 below the support 4. Through the opening 41 arranged on the support 4, the upper chamber and the lower chamber can communicate with each other, without affecting work of the air spring.

It is to be noted that the figure illustrates a sectional view of the opening 41 of the support 4, and accordingly the opening 41 of the support 4 is shown but a part of the support 4 that is in contact with the anti-impact cap 11 of the shock absorber cylinder 1 is not shown, while this part does exist.

The support 4 may be fixedly connected to the free end 31 of the piston 3. In a preferred implementation according to the invention, the support 4 and the free end 31 of the piston 3 are integrally constructed, thereby avoiding excessive connection relationships, and reducing the number of parts and assembly steps.

Still further, the shock absorber includes a base 5, and the base 5 is connected to a chassis. A fixed end 32 (a lower end in the figure), opposite the free end 31, of the piston 3 abuts against the base 5, thereby supporting the piston 3 and restricting the piston 3 from moving downwards. A seal ring 6 is disposed between the fixed end 32 of the piston 3 and the shock absorber cylinder 1. For example, the seal ring 6 is embedded in a groove in the base 5, the fixed end 32 of the piston 3 and the base 5 are connected in an interference fit manner at a position near the seal ring 6, so that the air chamber is kept sealed. The base 5 and the piston 3 are made of metal, for example. The seal ring 6 is made of rubber, for example.

In the implementation shown in FIG. 1, the shock absorber includes a piston rod 12, the piston rod 12 is inserted in the shock absorber cylinder 1, and the piston rod 12 can move relative to the shock absorber cylinder 1. A buffer block 13 is disposed at an upper end of the piston rod 12. The buffer block 13 interacts with the anti-impact cap 11 that sleeves the shock absorber cylinder 1, so as to relieve an impact generated between them.

The shock absorber further includes a protective cylinder 7 arranged peripherally. A fixed end 22, opposite the free end 21, of the damping spring 2 is fixedly connected to the protective cylinder 7. In the implementation shown in FIG. 1, a dust cover 8 is disposed beneath the protective cylinder 7 to play a role in protecting components such as the damping spring 2 and the piston 3 inside the dust cover 8. The dust cover 8 is a rubber member, for example.

Figure 3:
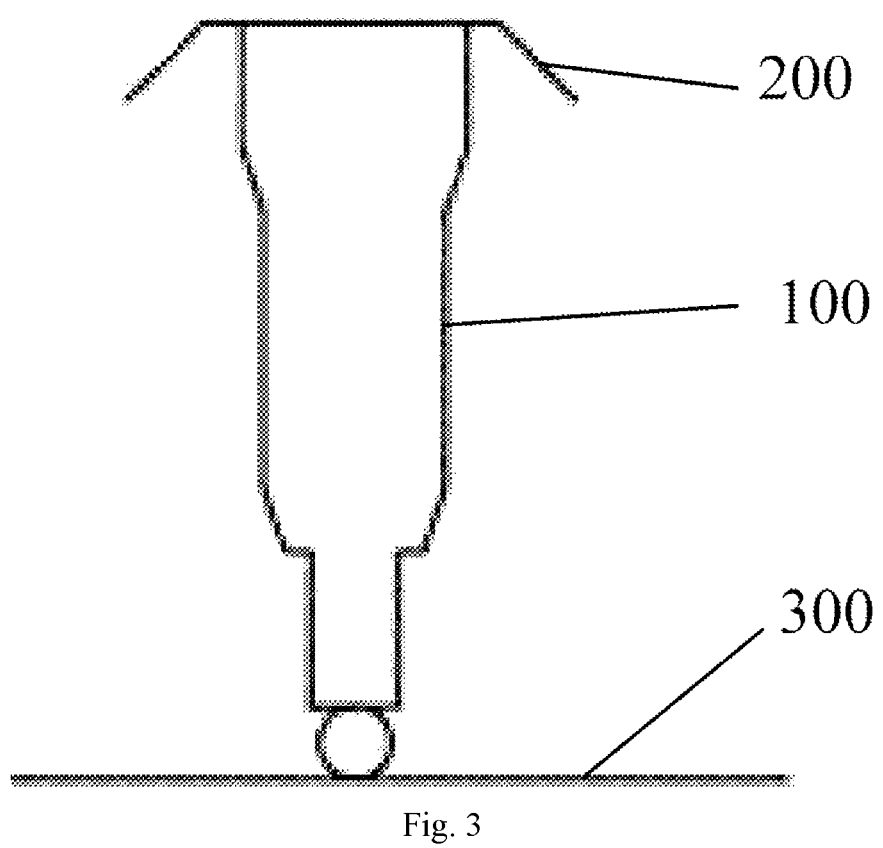
FIG. 3 illustrates a positional relationship between the shock absorber in FIG. 1 and a vehicle body and a chassis.

Referring to FIG. 3, the shock absorber 100 is substantially arranged between a vehicle body 200 and a chassis 300. In the working process of the shock absorber, under a damped motion between the piston rod 12 and the shock absorber cylinder 1, and the cooperation between the air chamber composed of the damping spring 2, the piston 3, and the shock absorber cylinder 1 and elasticity of the damping spring, effects of buffering, damping, and keeping vehicle attitude stable are achieved finally.

The invention further includes an automobile with the shock absorber according to any one or more of the implementations described above, which therefore has the technical features and the technical effects corresponding to those described above, and no more detailed description is provided herein.

The technical scope of this application is not merely limited to the above description. A person skilled in the art can make various variations and modifications to the above embodiments without departing from the technical concept of this application, and these variations and modifications shall fall within the scope of protection of this application.

What is claimed is:

1. A shock absorber, comprising a shock absorber cylinder and an air spring arranged around the shock absorber cylinder, wherein the air spring comprises a damping spring and a piston, a free end of the damping spring is supported at a free end of the piston, a support is disposed between the piston and the shock absorber cylinder, and the free end of the piston is supported on the shock absorber cylinder by the support, the support and the free end of the piston are integrally constructed, and an outer side of an upper end of the shock absorber cylinder is sleeved with an anti-impact cap, the support is arranged between the piston and the anti-impact cap.

2. The shock absorber according to claim 1, wherein the periphery of the support abuts against the shock absorber cylinder.

3. The shock absorber according to claim 2, wherein the support is provided with an opening.

4. The shock absorber according to claim 3, wherein the opening is arranged on the periphery of the support.

5. The shock absorber according to claim 1, wherein the shock absorber cylinder is sleeved with an anti-impact cap, and the support is arranged between the piston and the anti-impact cap.

6. The shock absorber according to claim 1, wherein the shock absorber comprises a base, and a fixed end, opposite the free end, of the piston abuts against the base.

7. The shock absorber according to claim 6, wherein a seal ring is disposed between the fixed end of the piston and the shock absorber cylinder.

8. The shock absorber according to claim 1, wherein the shock absorber comprises a piston rod, the piston rod is inserted into the shock absorber cylinder, and the piston rod is able to move relative to the shock absorber cylinder.

9. The shock absorber according to claim 1, wherein the shock absorber comprises a protective cylinder arranged peripherally, and a fixed end, opposite the free end, of the damping spring is fixedly connected to the protective cylinder.

10. The shock absorber according to claim 1, wherein the shock absorber is arranged between a vehicle body and a chassis.

11. An automobile, comprising the shock absorber according to claim 1.

* * * * *